(No Model.)
D. R. WILDER.
INFANT'S FOOD WARMER.
No. 538,056. Patented Apr. 23, 1895.
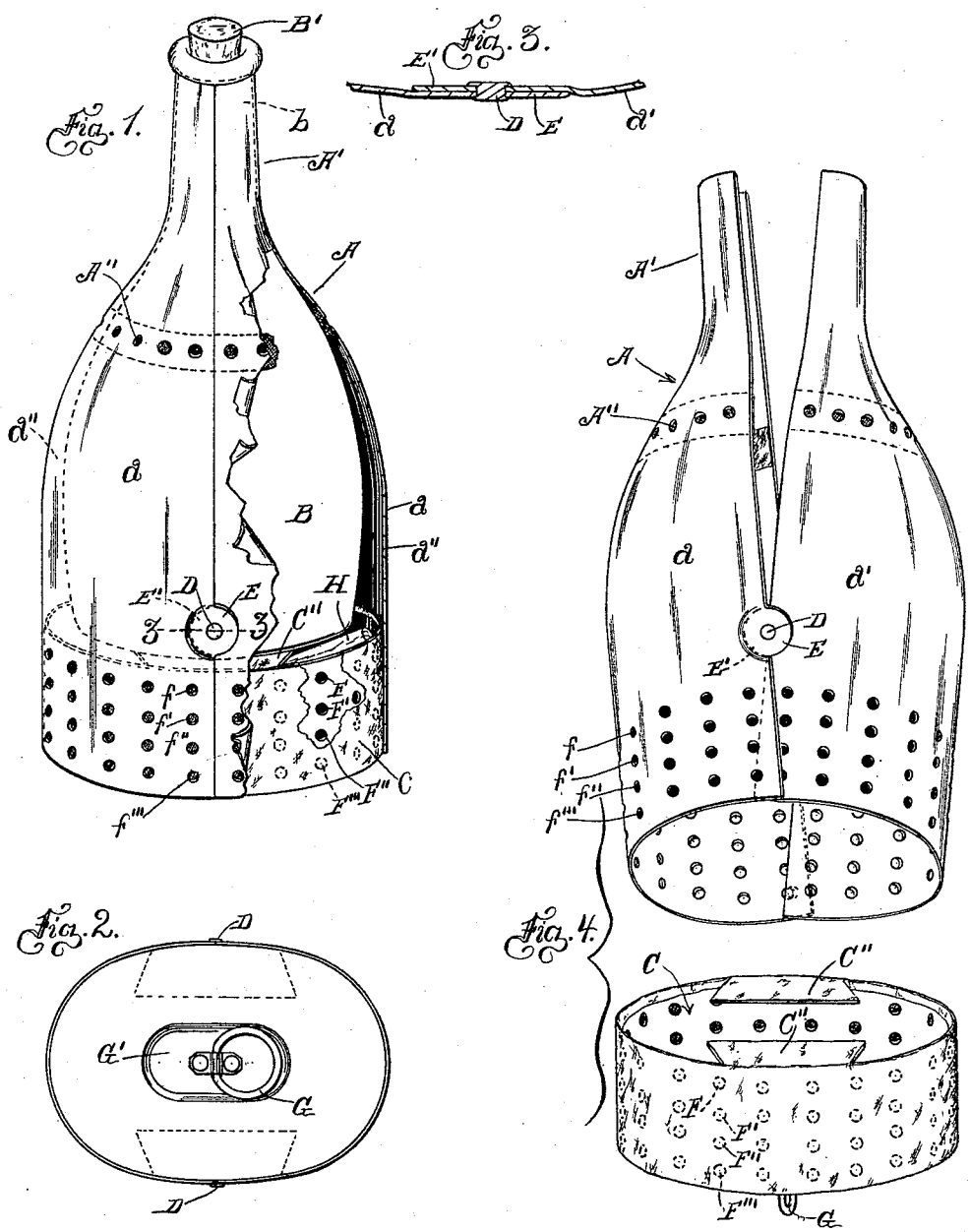

UNITED STATES PATENT OFFICE.

DEEL RINALDO WILDER, OF LOS ANGELES, CALIFORNIA.

INFANT'S FOOD-WARMER.

SPECIFICATION forming part of Letters Patent No. 538,056, dated April 23, 1895.

Application filed February 5, 1895. Serial No. 537,336. (No model.)

*To all whom it may concern:*

Be it known that I, DEEL RINALDO WILDER, a citizen of the United States, residing at Los Angeles, in the county of Los Angeles and State of California, have invented a new and useful Infant's Food-Warmer, of which the following is a specification.

Considerable difficulty is experienced by mothers in feeding children prepared food or milk from bottles, the difficulty arising from the fact that the temperature of the food or milk, which should be substantially that of animal heat is very difficult to regulate. It often occurs that the child should be fed at times when no appliance is convenient for warming the food and consequently the child must either wait until the food can be properly warmed, or eat it cold. Nearly all infants require to be fed during the night and on such occasions the labor and inconvenience of preparing the food are especially disagreeable.

The object of my invention is to provide a device whereby the food may be heated to a temperature substantially that of animal heat and maintained at such temperature for a period of from four to five hours without any attention whatever, thus causing the food to be always ready to be fed to the infant; also to so arrange the device that the supply of heat will be maintained while the child is being fed.

My newly invented food warmer comprises a case arranged to receive and inclose a bottle and provided with a combustion chamber within which to place a suitable slow combustive, and also provided with suitable perforations to admit air into the combustion chamber.

My invention also comprises the peculiar combination and arrangement of parts whereby I am enabled to carry my invention into practical operation in the most convenient and effective manner.

The accompanying drawings illustrate my invention.

Figure 1 is a perspective side elevation of my improved food warmer a portion of the case being broken away to expose the bottle which is in position in the case. Fig. 2 is a bottom view of the same. Fig. 3 is a fragmental section on line 3—3 Fig. 1. Fig. 4 is a perspective view of the case opened to admit the bottle, and the combustion chamber removed from the case.

In the drawings A represents the case which is composed of two parts $a$ and $a'$ which are arranged to be separated to admit the bottle B into the case. This case as shown is bottle shaped, and its neck $A'$ is arranged to tightly clamp about the neck $b$ of the bottle to hold the bottle suspended in the case as shown in Fig. 1. The body of the case has a chamber of a size larger than the bottle which is used thus to provide an air chamber $a''$ between the bottle and the walls of the case to admit heated air from the combustion chamber C into such chamber and around the bottle, so as to uniformly heat the contents thereof.

In order to arrange the case so it can be easily opened to allow the bottle to be placed therein, it is necessary that it be divided longitudinally from the base to the top of the neck and the two parts $a$, $a'$ arranged to separate at the upper or neck end to admit the neck $b$ of the bottle.

I have shown in the drawings a form whereby I provide a case which I consider the most simple, effective and convenient and one not liable to become inoperative or broken in use, but it is understood that my invention is not limited to the particular construction or mechanical details shown.

The form shown consists of the two longitudinally arranged halves or parts $a$, $a'$ hinged or pivoted together intermediate their ends by pivots D arranged in projecting lobes E, E' which are formed integral with the parts $a$, $a'$ and overlap each other as shown in Fig. 3. The case is made of spring metal and the lobes E, E' offset as shown in Fig. 3, so as to bring the edges of the two parts $a$, $a'$ exactly in alignment with each other so that when the case is closed as shown in Fig. 1 the exterior of the case will be smooth and the edges of the two members of the case below the pivots will abut against each other as shown in Fig. 2, thereby holding the case in its closed position with its neck encircling or clasping the neck of the bottle. By compressing the member $a'$ below the pivotal point of the two members the edges of the member $a'$ are thereby thrown out of alignment with the edges of the member $a$ and as the neck of the case is opened the lower portion of the edges of the member $a'$ slide inside of the member $a$ as shown in Fig. 4. This allows the bottle to be readily placed in position in the case or removed therefrom.

The combustion chamber C is cup shaped and formed to fit closely in the base of the case as shown in Figs. 1 and 2, so that when thus in place it wedges the lower portion of the two members apart; thus forcing the top of the members against the neck of the bottle, and holding the case firmly in its closed position. The combustion chamber is provided with four series of holes F, F', F'', F''', arranged in its walls and the case is also provided with series of holes $f$, $f'$, $f''$, $f'''$. These series of holes register with each other as shown in Fig. 1, and the case is designed to admit of the use therein of three different sizes of standard nursing bottles. The necks of the bottles of different size are the same in diameter, but the bottles are of different length, and these series of holes are arranged at a distance apart equal to the difference in length between the medium sized bottle and the other bottle, so that when a bottle of any one of the three standard sizes is placed in position in the case and the combustion chamber is forced into its seat in the case, when the ears C'' of the combustion chamber engage with the bottom of the bottle the series of holes in the combustion chamber and the series of holes in the walls of the case will register with each other so that air will be admitted into the combustion chamber to allow combustion of the fuel H therein—that is to say, when a medium sized bottle is in place in the case as shown in Fig. 1, the holes F, F', &c., will register respectively with the holes $f$, $f'$, &c., and when the larger size is used the holes F, F', &c., will register with the holes $f'$, $f''$, &c. When the smaller size is used the holes F', F'', F''' will register with the holes $f$, $f'$, $f''$, while the series F will be closed by the imperforate wall of the case. The combustion chamber is covered with adhesive cloth as shown in Figs. 1 and 4 in order to prevent the escape of ashes from the chamber, and also to allow an infiltration of air through all the perforations in the sides of the chamber but to prevent the admission of too much air at any one point.

In order to cause the heat from the combustion chamber C to circulate perfectly in the chamber $a''$ around the bottle B, I provide an upper series of perforations A'' in the walls of the case surrounding the neck of the bottle and the heated air rises from the combustion chamber and passes out through the upper perforations, warming the bottle and its contents in its passage through the chamber. The perforations A'' are also covered with cloth to prevent too rapid circulation of air in the chamber.

A ring G is provided in a sunken chamber G' at the base of the combustion chamber, by which to withdraw the combustion chamber from its position in the case when it is desired to supply combustibles to the chamber or to remove the bottle from or replace it in the case.

In using my invention it is essential that a combustible be employed which will be extremely slow in consuming, giving off no odor, smoke or flame, and which will not yield sufficient heat to heat the contents of the bottle to a temperature above that of animal heat, or about 98° Fahrenheit. I have employed as the combustible H the material known as Japanese punk which is used in the hand warmers employed by the Japanese, and I find that the temperature produced by the combustion of this punk is 98° Fahrenheit, substantially that of blood or animal heat. Two small packages of this punk will last about four or five hours.

In practice the food is placed in the bottle B and the case is opened as shown in Fig. 4 and the bottle is placed in position by slipping it up through the case until the neck of the bottle protrudes from the neck of the case. Then the case is closed as shown in Fig. 1 and the combustion chamber C with its ignited charge of punk H or other combustible is inserted in the base of the case and the bottle and the case are set upright. The air entering the perforations in the bottom of the case is heated in the combustion chamber C, passes upward and circulates in the chamber $a''$ around the bottle and finally passes out through the perforations A'' in the neck of the case, thus heating the food to the required temperature and maintaining it at such temperature until the punk is all consumed. I have found in practice that it requires about one hour after the punk is ignited to bring the food to the proper temperature and that it will remain at this temperature for about three or four hours longer. A second charge of combustible may then be placed in the combustion chamber if it is desired to maintain the heat for a greater length of time. I close the bottle B by a stopper B' until the child is to be fed, when I remove the stopper and place a nipple upon the neck of the bottle. The bottle is not removed from the case until it is to be cleansed, and the case which may be plated or made of polished metal is not only attractive in appearance, but also protects the bottle against breakage. Also by arranging the case so that the top of the neck of the bottle projects from the case I am enabled to attach the nipple to the bottle without removing the bottle from the case and to maintain the supply of heat to keep the food at a uniform temperature while the child is being fed. While I consider this punk the most convenient and preferable to use, still I do not limit my invention to the use of any particular combustible in the combustion chamber since other slow burning material may be provided to supply the heat to the bottle.

One essential feature of my invention is that of suspending the bottle centrally in the casing so that the bottle is not in contact with the casing at any point excepting at the neck thereof since I thereby prevent the absorption of heat from the bottle by convection, which would deprive the food of its heat much more rapidly than radiation. Therefore by my invention the food is kept warm with a less expenditure of heat and for a greater length of time after combustion has ceased than would be possible if the case was in contact with the body of the bottle.

Now, having described my invention, what I claim as new, and desire to secure by Letters Patent, is—

1. The combination of a bottle shaped case open at both ends and provided with perforations below its neck and near the top of its body; a bottle having the top of its body arranged in the chamber within the body of the case with a space around it between it and the walls of the case below the perforations, and having its neck fitted to and clamped by the neck of the case and projecting beyond the end of the case neck; and a removable combustion chamber fitted into the chamber of the case beneath the bottle.

2. A food warmer comprising a bottle shaped case consisting of two separable members arranged to receive a bottle and to be secured together inclosing the bottle with the top of the neck of the bottle projecting from the case, such case being provided in its base with a combustion chamber.

3. A food warmer consisting of a case having a neck arranged to clamp tightly about the neck of a bottle and having its body arranged to form an air chamber between the bottle and the walls of the chamber, and suitable means for supplying heated air to such air chamber.

4. A food warmer consisting of a separable case arranged to receive a bottle, the body of the case being arranged to form an air chamber surrounding the bottle, and the neck of the case being arranged to clamp tightly upon the neck of the bottle to thereby hold the bottle centrally in such chamber and a combustion chamber arranged to supply heated air to such air chamber.

5. A food warmer comprising a bottle shaped case consisting of two longitudinally arranged parts, such parts being pivoted together intermediate the ends of the case, and a combustion chamber arranged to fit, when the case is closed, into the base of the case below the pivotal point of the two parts to thereby hold the case firmly in its closed position.

6. A food warmer comprising a bottle shaped case consisting of two longitudinally arranged parts pivoted together near the lower end of the case, such case being arranged to form a chamber surrounding the bottle, and the neck of the case being arranged to clamp tightly upon the neck of the bottle to hold the bottle centrally in such chamber, such case being provided near its top with perforations and provided near its bottom with a series of perforations: a combustion chamber arranged to fit in the lower end of the case, and provided with series of perforations arranged to register with the series of perforations in the case.

DEEL RINALDO WILDER.

Witnesses:
   ALFRED I. TOWNSEND,
   JAMES R. TOWNSEND.